(12) United States Patent
Thelen et al.

(10) Patent No.: US 6,526,380 B1
(45) Date of Patent: Feb. 25, 2003

(54) SPEECH RECOGNITION SYSTEM HAVING PARALLEL LARGE VOCABULARY RECOGNITION ENGINES

(75) Inventors: Eric Thelen, Aachen (DE); Stefan Besling, Aachen (DE); Meinhard Ullrich, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/370,490

(22) Filed: Aug. 9, 1999

(30) Foreign Application Priority Data

Mar. 26, 1999 (EP) .............................. 99200949

(51) Int. Cl.⁷ .............................................. G10L 15/00
(52) U.S. Cl. .......................... 704/251; 704/255; 704/256
(58) Field of Search .................................. 704/231, 243, 704/250, 251, 255, 270, 256

(56) References Cited

U.S. PATENT DOCUMENTS

| | | | | |
|---|---|---|---|---|
| 5,513,298 A | * | 4/1996 | Stanford et al. | 704/243 |
| 5,754,978 A | * | 5/1998 | Perez-Mendez et al. | 704/255 |
| 5,819,220 A | | 10/1998 | Sakukkai et al. | 704/243 |
| 5,937,383 A | * | 8/1999 | Ittycheriah et al. | 704/255 |
| 6,073,101 A | * | 6/2000 | Maes | 704/275 |
| 6,088,669 A | * | 7/2000 | Maes | 704/231 |

FOREIGN PATENT DOCUMENTS

| | | | |
|---|---|---|---|
| DE | 19635754 A | 3/1998 | G10L/5/00 |
| EP | 087282782 | 10/1998 | G10L/3/00 |

OTHER PUBLICATIONS

"Fundamentals of Speech Recognition" by L. Rabiner et al, Prentice Hall 1993, pp. 434–454.

* cited by examiner

*Primary Examiner*—Susan McFadden
(74) *Attorney, Agent, or Firm*—Daniel J. Piotrowski

(57) ABSTRACT

A huge vocabulary speech recognition system for recognizing a sequence of spoken words, having an input means for receiving a time-sequential input pattern representative of the sequence of spoken words. The system further includes a plurality of large vocabulary speech recognizers each being associated with a respective, different large vocabulary recognition model. Each of the recognition models is targeted to a specific part of the huge vocabulary. The system comprises a controller operative to direct the input pattern to a plurality of the speech recognizers and to select a recognized word sequence from the word sequences recognized by the plurality of speech recognizers.

8 Claims, 3 Drawing Sheets

SPEECH RECOGNITION SYSTEM HAVING PARALLEL LARGE VOCABULARY RECOGNITION ENGINES

The invention relates to a huge vocabulary speech recognition system for recognizing a sequence of spoken words, the system comprising input means for receiving a time-sequential input pattern representative of the sequence of spoken words; and a large vocabulary speech recognizer operative to recognize the input pattern as a sequence of words from the vocabulary using a large vocabulary recognition model associated with the speech recognizer.

From U.S. Pat. No. 5,819,220 a system is known for recognizing speech in an Internet environment. The system is particularly targeted towards accessing information resources on the World Wide Web (WWW) using speech. Building a speech recognition system as an interface to the Web faces very different problems from those encountered in traditional speech recognition domains. The primary problem is the huge vocabulary which the system needs to support, since a user can access virtually any document on any topic. It is very difficult, if not impossible, to build an appropriate recognition model, such as a language model, for those huge vocabularies. In the known system a predetermined recognition model, including a statistical n-gram language model and an acoustic model, is used. The recognition model is dynamically altered using a web-triggered word set. An HTML (HyperText Mark-up Language) document contains links, such as hypertext links, which are used to identify a word set to be included in the final word set for probability boosting the word recognition search. In this way the word set used for computing the speech recognition scores are biased by incorporating the web-triggered word set.

The known system requires a suitable huge vocabulary model as a starting model to be able to obtain a biased model after adaptation. In fact, the biased model can be seen as a conventional large vocabulary model optimized for the current recognition context. As indicated before, it is very difficult to build a suitable huge vocabulary model, also if it is only used as a starting model. A further problem occurs for certain recognition tasks, such as recognizing input for particular Web sites or HTML documents, like those present on search engines or large electronic shops, such as book stores. In such situations the numbers of words which can be uttered is huge. A conventional large vocabulary model will in general not be able to effectively cover the entire range of possible words. Biasing a starting model with relatively few words will not result in a good recognition model. Proper biasing would require a huge additional word set and a significant amount of processing, assuming the starting model was already reasonably good.

It is an object of the invention to provide a recognition system which is better capable of dealing with huge vocabularies.

To achieve the object, the system is characterized in that the system comprises a plurality of N large vocabulary speech recognizers, each being associated with a respective, different large vocabulary recognition model; each of the recognition models being targeted to a specific part of the huge vocabulary; and the system comprises a controller operative to direct the input pattern to a plurality of the speech recognizers and to select a recognized word sequence from the word sequences recognized by the plurality of speech recognizers.

By using several recognizers each with a specific recognition model targeted at a part of the huge vocabulary, the task of building a recognition model for a huge vocabulary is broken down into the manageable task of building large vocabulary models for specific contexts. Such contexts may include health, entertainment, computer, arts, business, education, government, science, news, travel, etc. It will be appreciated that each of those contexts will normally overlap in vocabulary, for instance in the general words of the language. The contexts will differ in statistics of those common words as well in the jargon specific for those contexts. By using several of those models to recognize the input, a wider range of utterances can be recognized using properly trained models. A further advantage of using several models is that this allows a better discrimination during the recognition. If one huge vocabulary was used, certain utterances would only be recognized in one specific meaning (and spelling). As an example, if a user pronounces a word sounding like 'color' most of the recognized word sequences will include the very common word 'color'. It will be less likely that the word 'collar' (of a fashion context) is recognized, or 'collar' of collared herring (food context), or collar-bone (health context). Those specific words do not have much chance of being recognized in a huge vocabulary which inevitably will be dominated by frequently occurring word sequences of general words. By using several models, each model will identify one or more candidate word sequences from which then a selection can be made. Even if in this final selection a word sequence with 'color' gets selected, the alternative word sequences with 'collar' in it can be presented to the user.

Preferably, the recognizers operate in parallel in the sense that the user does not experience a significant delay in the recognition. This may be achieved using separate recognition engines each having own processing resources. Alternatively, this may be achieved using a sufficiently powerful serial processor which operates the recognition tasks in 'parallel' using conventional time slicing techniques.

It should be noted that using parallel speech recognition engines is known. U.S. Pat. No. 5,754,978 describes using recognition engines in parallel. All of the engines have a relatively high accuracy of, e.g. 95%. If the 5% inaccuracy of the engines does not overlap, the accuracy of recognition can be improved. To ensure that the inaccuracies do not fully overlap, the engines may be different. Alternatively, the engines may be identical in which case the input signal to one of the engines is slightly pertubated or one of the engines is slightly pertubated. A comparator compares the recognized text and accepts or rejects the text based on the degree of agreement between the output of the engines. Since this system requires accurate recognition engines, which do not exist for huge vocabularies, this system provides no solution for huge vocabulary recognition. Neither does the system use different models targeted towards specific parts of a huge vocabulary.

WO 98/10413 describes a dialogue system with an optional number of speech recognition modules which can operate in parallel. The modules are targeted towards a specific type of speech recognition, such as isolated digit recognition, continuous number recognition, small vocabulary word recognition, isolated large vocabulary recognition, continuous word recognition, keyword recognition, word sequence recognition, alphabet recognition, etc. The dialogue system knows up front which type of input the user will supply and accordingly activates one or more of the specific modules. For instance, if the user needs to speak a number, the dialogue engine will enable the isolated digit recognition and the continuous number recognition, allowing the user to speak the number as digits or as a continuous number. The system provides no solution for dealing with huge vocabularies The recognition models of the system according to the invention may be predetermined. Preferably, as defined in dependent claim 2, a model selector is used to dynamically select at least one of the models actively used for recognition. The selection depends on the context of the user input, like the query or dictation subject. Preferably, the model selector selects many of the recognition models. In practice, at least one of the models will represent the normal day-to-day vocabulary on general subjects. Such a model will normally always be used.

In an embodiment as defined in dependent claim 3, the document defines the recognition context. As defined in the dependent claim 5, this may be done by scanning the words present in the document and determining the recognition model(s) which are best suited to recognize those words (e.g. those models which have most words or word sequences in common with the document).

In an embodiment as defined in the dependent claim 4, the context (or contexts) is indicated in a Web page, e.g. using an embedded tag identifying the context. The page may also indicate the context (or context identifier), for instance, via a link.

In an embodiment as defined in the dependent claim 6, the system actively tries to identify those recognition models which are suitable for the current recognition task. In addition to the recognition models which are at that moment actively used for the recognition, the other models are tested for their suitability. This testing may be performed as a background task by using one or more additional recognizers which check whether the not-used models would have given a better result than one of the actively used models. Alternatively, the actual recognizers may be used to test the test models at moments that the recognizer has sufficient performance left over, e.g. when the user is not speaking. The testing may include all input of the user. Particularly if the user has already supplied a lot of speech input, preferably the testing is limited to the most recent input. In this way, whenever the user changes subject quickly more suitable models can be selected. A criterion for determining which models are best suited, i.e. offer the highest accuracy of a recognition, is preferably based on performance indications of the recognition like scores or confidence measures.

In an embodiment as defined in the dependent claim 7, the recognition models are hierarchically arranged. This simplifies selecting suitable models. Preferably, recognition is started with a number of relatively generic models. If a certain generic model proves to provide good recognition result, more specific models can be tested to improve the recognition even further. Some of the more specific models may be shared by several more generic models. If at a certain moment the recognition results of a specific model become worse, several of the more generic models hierarchically above the specific model may be tried. This allows smooth transition from one context to another. As an example, a user may start with providing input on the generic context of health. At a certain moment it may be detected that the user is primarily focussing on the more specific context of medical centers or institutes, and even goes down to the most specific context of health farms. Particularly if the health farm is located in an attractive area, this may inspire the user to move to the more generic context of holidays or travel or, more specifically, travel in area of the health farm.

As defined in the dependent claim 8, the recognition may be done by a separate recognition server. In the context of Internet, such a server could be a separate station on the net, or be integrated with existing stations, such as a search engine, or a service provider, like an electronic book store. Particularly, recognition servers which operate for many users need to be able to support a vocabulary suited for most users. The use of several, specific large vocabulary models makes such a system better capable of performing this task with a high recognition accuracy.

These and other aspects of the invention will be apparent from and elucidated with reference to the embodiments shown in the drawings.

Figure 1:
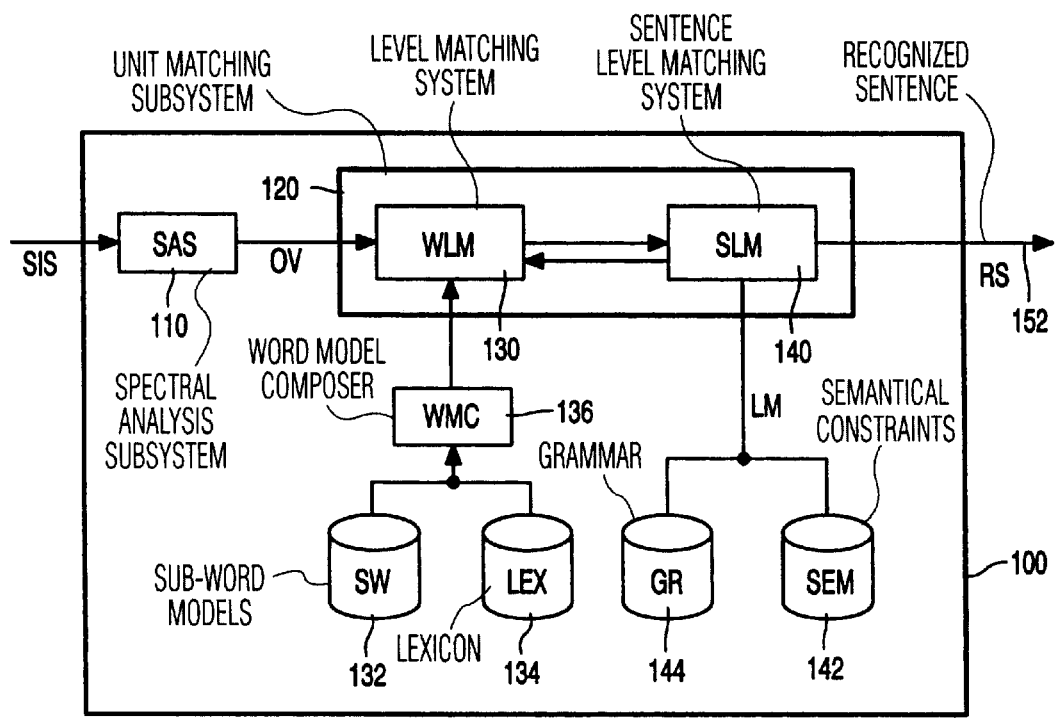
FIG. 1 shows a structure of a large/huge vocabulary recognizer.

Speech recognition systems, such as large vocabulary continuous speech recognition systems, typically use a collection of recognition models to recognize an input pattern. For instance, an acoustic model and a vocabulary may be used to recognize words and a language model may be used to improve the basic recognition result. FIG. 1 illustrates a typical structure of a large vocabulary continuous speech recognition system 100 [refer L.Rabiner, B-H. Juang, "Fundamentals of speech recognition", Prentice Hall 1993, pages 434 to 454]. The system 100 comprises a spectral analysis subsystem 110 and a unit matching subsystem 120. In the spectral analysis subsystem 110 the speech input signal (SIS) is spectrally and/or temporally analyzed to calculate a representative vector of features (observation vector, OV). Typically, the speech signal is digitized (e.g. sampled at a rate of 6.67 kHz.) and pre-processed, for instance by applying pre-emphasis. Consecutive samples are grouped (blocked) into frames, corresponding to, for instance, 32 msec. of speech signal. Successive frames partially overlap, for instance, 16 msec. Often the Linear Predictive Coding (LPC) spectral analysis method is used to calculate for each frame a representative vector of features (observation vector). The feature vector may, for instance, have 24, 32 or 63 components. The standard approach to large vocabulary continuous speech recognition is to assume a probabilistic model of speech production, whereby a specified word sequence $W=w_1w_2w_3 \ldots w_q$ produces a sequence of acoustic observation vectors $Y=Y_1Y_2Y_3 \ldots Y_T$. The recognition error can be statistically minimized by determining the sequence of words $w_1w_2w_3 \ldots w_q$ which most probably caused the observed sequence of observation vectors $Y_1Y_2Y_3 \ldots Y_T$ (over time $t=1, \ldots, T$), where the observation vectors are the outcome of the spectral analysis subsystem 110. This results in determining the maximum a posteriori probability:

max $P(W|Y)$, for all possible word sequences $W$

By applying Bayes' theorem on conditional probabilities, $P(W|Y)$ is given by:

$P(W|Y)=P(Y|W).P(W)/P(Y)$

Since $P(Y)$ is independent of $W$, the most probable word sequence is given by:

arg max $P(Y|W).P(W)$ for all possible word sequences $W$ (1)

Figure 2:
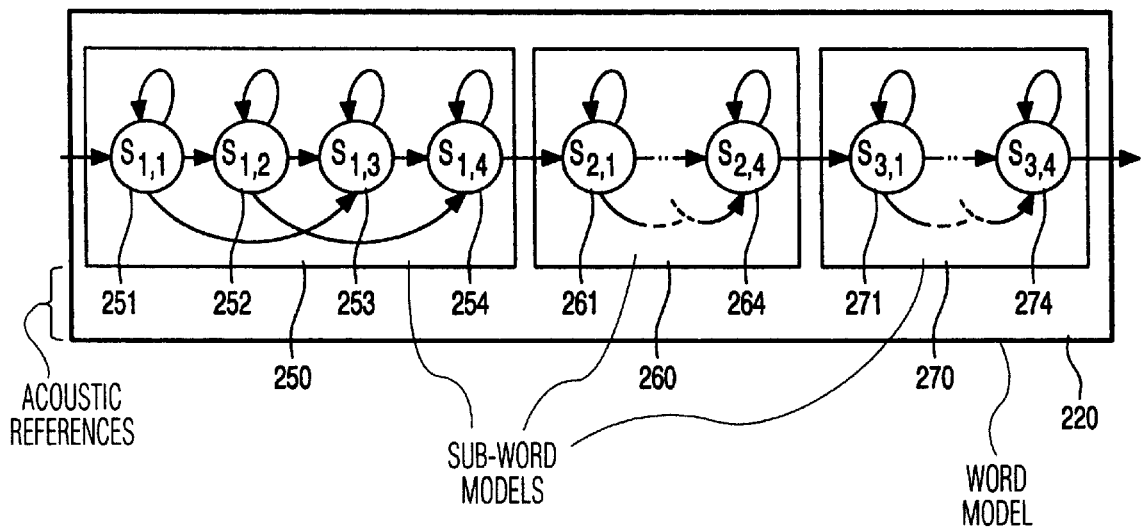
FIG. 2 illustrates a full word model.

In the unit matching subsystem 120, an acoustic model provides the first term of equation (1). The acoustic model is used to estimate the probability $P(Y|W)$ of a sequence of observation vectors Y for a given word string W. For a large vocabulary system, this is usually performed by matching the observation vectors against an inventory of speech recognition units. A speech recognition unit is represented by a sequence of acoustic references. Various forms of speech recognition units may be used. As an example, a whole word or even a group of words may be represented by one speech recognition unit. A word model (WM) provides for each word of a given vocabulary a transcription in a sequence of acoustic references. For systems, wherein a whole word is represented by a speech recognition unit, a direct relationship exists between the word model and the speech recognition unit. Other systems, in particular large vocabulary systems, may use for the speech recognition unit linguistically based sub-word units, such as phones, diphones or syllables, as well as derivative units, such as fenenes and fenones. For such systems, a word model is given by a lexicon 134, describing the sequence of sub-word units relating to a word of the vocabulary, and the sub-word models 132, describing sequences of acoustic references of the involved speech recognition unit. A word model composer 136 composes the word model based on the subword model 132 and the lexicon 134. FIG. 2 illustrates a word model 220 for a system based on sub-word units, where the shown word is modeled by a sequence of three sub-word models (250, 260 and 270), each with a sequence of four acoustic references (251, 252, 253, 254; 261 to 264; 271 to 274). The word model shown in FIG. 2 is based on Hidden Markov Models (HMMs), which are widely used to stochastically model speech signals. Using this model, each recognition unit (word model or subword model) is typically characterized by an HMM, whose parameters are estimated from a training set of data. For large vocabulary speech recognition systems usually a limited set of, for instance 40, sub-word units is used, since it would require a lot of training data to adequately train an HMM for larger units. An HMM state corresponds to an acoustic reference. Various techniques are known for modeling a reference, including discrete or continuous probability densities. Each sequence of acoustic references which relate to one specific utterance is also referred as an acoustic transcription of the utterance. It will be appreciated that if other recognition techniques than HMMs are used, details of the acoustic transcription will be different.

A word level matching system 130 of FIG. 1 matches the observation vectors against all sequences of speech recognition units and provides the likelihoods of a match between the vector and a sequence. If sub-word units are used, constraints can be placed on the matching by using the lexicon 134 to limit the possible sequence of sub-word units to sequences in the lexicon 134. This reduces the outcome to possible sequences of words.

For full recognition, it is preferred to also use a sentence level matching system 140 which, based on a language model (LM), places further constraints on the matching so that the paths investigated are those corresponding to word sequences which are proper sequences as specified by the language model. As such the language model provides the second term P(W) of equation (1). Combining the results of the acoustic model with the language model, results in an outcome of the unit matching subsystem 120 which is a recognized sentence (RS) 152. The language model used in pattern recognition may include syntactical and/or semantical constraints 142 of the language and the recognition task. A language model based on syntactical constraints is usually referred to as a grammar 144. The grammar 144 used by the language model provides the probability of a word sequence $W=w_1w_2w_3\ldots w_q$, which in principle is given by:

$$P(W)=P(w_1)P(w_2|w_1).\ P(w_3|w_1w_2)\ldots P(w_q|w_1w_2w_3\ldots w_q).$$

Since in practice it is infeasible to reliably estimate the conditional word probabilities for all words and all sequence lengths in a given language, N-gram word models are widely used. In an N-gram model, the term $P(w_j|w_1w_2w_3\ldots w_{j-1})$ is approximated by $P(w_j|w_{j-N+1}\ldots w_{j-1})$. In practice, bigrams or trigrams are used. In a trigram, the term $P(w_j|w_1w_2w_3\ldots w_{j-1})$ is approximated by $P(w_j|w_{j-2}w_{j-1})$.

Figure 3:
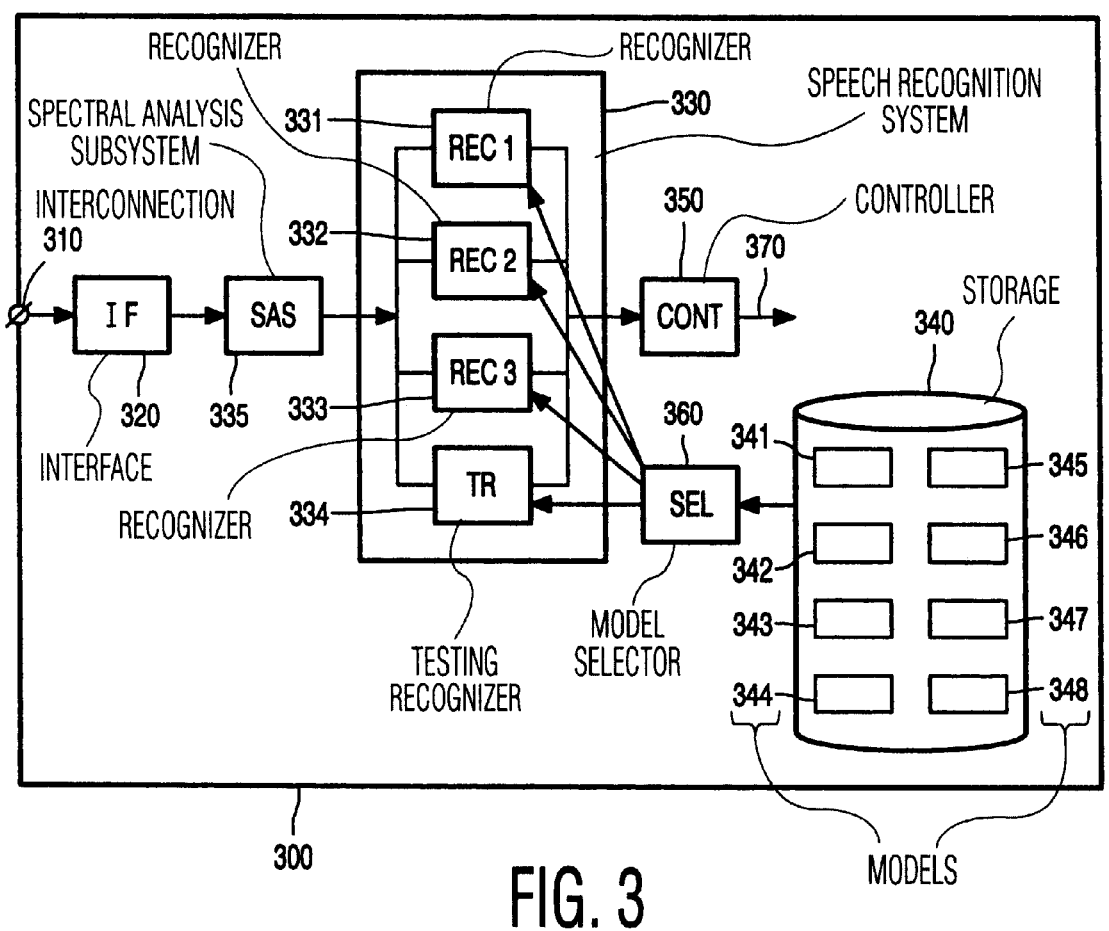
FIG. 3 shows a block diagram of a system according to the invention.

FIG. 3 shows a block diagram of a speech recognition system 300 according to the invention. Examples of the working of the system will be described in particular for an application wherein recognized speech is converted to a textual or similar representation. Such textual representation may be used for dictation purposes, where the text representation is entered in a document, e.g. in word processor, or in a textual field, e.g. for specifying a field in a database. For dictation, current large vocabulary recognizers support an active vocabulary and lexicon of up to 60,000 words. It is difficult to obtain sufficient relevant data to build models capable of sufficiently accurate recognition for a much larger number of words. Typically, a user may add a limited number of words to the active vocabulary/lexicon. Those words can be retrieved from a background vocabulary of 300,000 to 500,000 words (which also contains an acoustic transcription of the words). For dictation or similar purposes a huge vocabulary may, for instance, consist of at least 100,000 active words or even over 300,000 active words. It will be appreciated that particularly for an Internet environment where by a click on a link an entirely different context may be created it is preferred that many of the words of the background vocabulary can be actively recognized. For other recognition tasks, such as recognizing names, which are usually modeled as a flat list with some form of prior name probability attached to it, but for which no high quality language model exists, a vocabulary of over 50,000 words can already be classified as huge.

It will be understood that the recognition outcome need not be used for dictation purposes. It may equally well be used as input for other systems, such as dialogue systems, wherein depending on the recognized speech information is retrieved from a database or an operation is effected, like ordering a book or reserving a journey.

In FIG. 3, a standalone system 300 is shown, which preferably is implemented on a computer, such as a PC. Item 310 represents an interconnection for receiving a speech representative signal from a user. For instance, a microphone may be connected to the interconnection 310. It will be appreciated that the speech representative signal may also have been prerecorded or be retrieved from a remote location, e.g. via a telephone or a network. The system 300 comprises an interface 320 to receive the input from the user. This may for instance be implemented using a conventional audio card. If the interface has an input for receiving speech in an analogue form, the interface preferably comprises an A/D converter for converting the analogue speech to digital samples of a format suitable for further processing by a speech recognition system 330. If the interface has an input for receiving the speech in a digital form, preferably the converter is capable of converting the digital data to a suitable digital format for further processing. The speech recognition system 330 typically analyses the input signal as for instance described for the spectral analysis subsystem 110 of FIG. 1. According to the invention the speech recognition system 330 comprises a plurality of large vocabulary speech recognizers, each being associated with a respective, different large vocabulary recognition model. For a typical recognition as shown in FIG. 1, the individual recognizers can share the model-independent spectral analysis subsystem 110 of FIG. 1 as shown in FIG. 3 under number 335. FIG. 3, illustrates using three separate recognizers 331, 332, and 333. The recognizers may use the same algorithm, where the difference lies in the models being used, such as the vocabulary and the language model. The speech recognition is preferably speaker-independent and allows continuous speech input. By itself, speech recognition is known and has been disclosed in various documents, such as EP 92202782.6, corresponding to U.S. Ser. No. 08/425,304 (PHD 91136), EP 92202783.4, corresponding to U.S. Ser. No. 08/751,377 (PHD 91138), EP 94200475.5, corresponding to U.S. Pat. No. 5,634,083 (PHD 93034), all to the assignee of the present application. The recognizers operate in 'parallel', in the sense that they independently recognize the same speech input at almost the same moment. This can be realized by using separate resources for each of the recognizers, such as a separate processor or processing unit in a 'parallel' operating processor, such as a VLIW processor. A similar 'parallel' performance can also be obtained on a conventional sequential processor with a sufficient high performance where each recognizer is executed as a separate task. Preferably, the recognition is 'real-time' in the sense that no significant delay occurs in the recognition of a word, after the word has been received in the system.

According to the invention, each of the large vocabulary speech recognizers is associated with a respective, different large vocabulary recognition model, where each of the recognition models is targeted to a specific part of the huge vocabulary. The models are preferably loaded from a storage 340. For the description here a recognition model is meant to be a coherent set of models used for one recognition task. For instance, referring to FIG. 1, the recognition model consists of a word model (lexicon 134 and sub-word model 132) and a language model (grammar 144 and semantical constraints 142) for one specific part of the huge vocabulary. Of course, an overlap may and will normally exist between the various recognition models. Such an overlap will usually occur in part of the vocabulary. The language model may also partly or even entirely be the same. In a simple system, the number of recognition models corresponds to the number of recognizers; each recognizer being associated with an exclusive recognition model in a fixed one-to-one relationship. Preferably, the system comprises more models than active recognizers, as will be described in more detail below. The figure shows eight models 341 to 348.

The output of the recognizers is directed to a controller 350 to make the final selection of a recognized word sequence. The individual recognizers 331 to 333 may produce only one recognized word sequence. Alternatively, also multiple sequences (e.g. represented by a word graph) may be produced. Preferably, the result of the individual recognizers includes information, such as likelihood, or confidence measures, allowing the controller 350 to select a most likely word sequence. The controller 350 is also responsible for directing the speech input to the recognizers. This directing may be fixed if the number of active recognizers is constant, in which case the controller 350 has no specific task for the directing.

In a preferred embodiment, the system comprises more recognition models (M) than active recognizers (N). A model selector 360 is used to select for at least one of the speech recognizers the associated recognition model from the M models in dependence on a recognition context. The model selector 360 may select a model for each of the active recognizers. However, it is preferred that a basic recognition model, covering the commonly used vocabulary, is always active. In such a situation at least one model needs not to be selected by the model selector 360 and can be fixedly assigned to a recognizer.

In a further embodiment, at least one recognition model is selected based on a context determined by a document to which the speech input relates. For instance, if a user dictates into a document on the subject of health, one recognizer may be loaded with a specific recognition model optimized for recognizing health related speech. The user may explicitly indicate the context for the document, e.g. by selecting from a list of possible contexts corresponding to the models of the system. In this case, the system 300 may present such a list to the user in a conventional manner, e.g. using a selection box in a window. The system may also automatically determine a context, e.g. by scanning the text already present in the document or spoken so-far and checking which of the models is best suitable to recognize such a text (e.g. which model has most words or word sequences in common with the text so-far). Also a context identifier may be associated with the document and obtained by the system 300 to determine the most suitable model. Preferably for speech relating to Web pages, such as an HTML page, it is preferred that the context(s) of the document is/are specified in the document or in association with the document. This may be done in the form of a tag, enclosed by the creator of the original Web page to which the speech relates. The tag may explicitly indicate the context, e.g. in the form of a textual subject, like sport, health, entertainment, etc. The specification may also be indirect, e.g. in the form of an identifier, such as a context number, or even a link (e.g. hypertext link) to a location specifying the context. In the latter case, the system 300 is capable of deriving the actual context from the implicit context specification (e.g. by mapping a context number to one of the recognition models, or by accessing the hypertext link and obtaining the context information).

In a preferred embodiment, the model selector 360 is actively trying to improve the recognition by checking which of the available recognition models is best suited for the recognition at hand. To this end the model selector 360 controls at least one test recognizer, shown is recognizer 334. The testing recognizer 334 is coupled to one of the recognition models not yet used by the active recognizer 331 to 333. Part (or even all) of the received speech is also fed to the test recognizer. The outcome of the test recognition is compared to the outcome of the selection by the controller 350 or the outcome of the individual active recognizers 331 to 333. If the recognition result of the testing recognizer 334 is better than the recognition result of one of the active recognizers 331 to 333, then the test recognition model (i.e. the model at that moment used by the testing recognizer 334) is loaded for use by one of the active recognizers. Preferably, the recognition model which gave worst recognition result is replaced (possibly with the exception of the basic recognition model, which might always be used).

Figure 4:
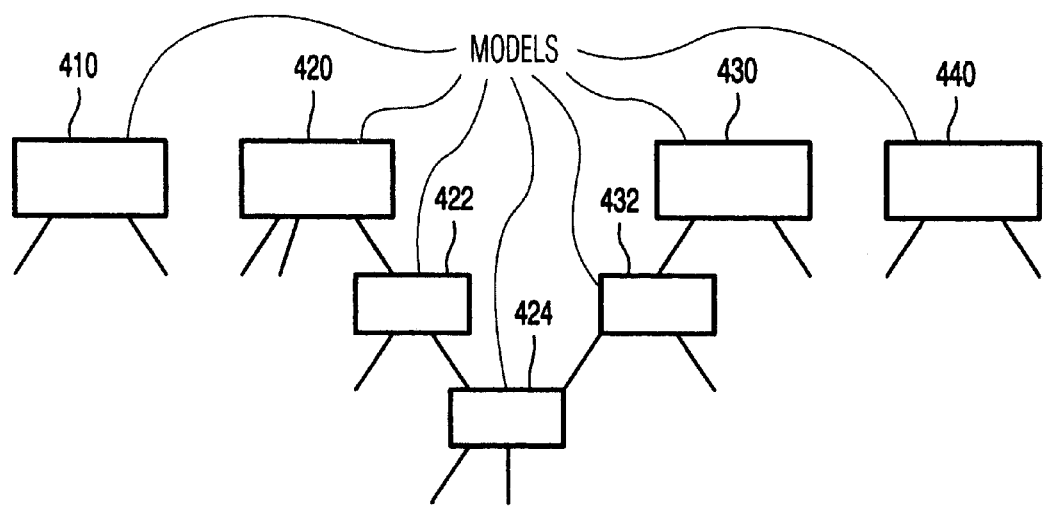
FIG. 4 shows a hierarchy of recognition models.

It is preferred that the recognition models are hierarchically arranged from models with a more generic context to models with a more specific context. FIG. 4 shows such a hierarchy, with four most generic models 410, 420, 430 and 440, for instance covering the respective general subjects of entertainment, health, travel and computer. A generic model is built by analyzing representative texts for all issues within the subject. In itself it is well known how models can be built from representative texts. The health generic model may be associated with hierarchically lower (i.e. more specific models), such as relating to medicine, surgery, food/diet, hospitals/medical centers. Each of those models is created by using texts relating to those more specific subjects. In the figure, model 422 may relate to hospitals/medical centers. Within this context, a further subdivision may be made where, for example, model 424 covers health farms. By analyzing texts relating to health farms, automatically a recognition model will be created which is also suitable for recognizing speech relating to certain travelling subjects, since documents on health farms typically describe the surrounding areas. This makes the same model suitable for use as a model hierarchically below a model 432 in the category travel models. The model selector 360 is operative to enable recognition with a more specific model if recognition with a certain model obtains good recognition results. Such a more specific model (i.e. hierarchically lower) may be used as a replacement for the more generic model. It may also be used in addition to the more generic model. It is preferred that adding recognition with more specific models only takes place of the more generic model performs well compared to other hierarchically-unrelated models at the same level in the hierarchy as the more generic model. For instance, if a sport and a health model are hierarchically unrelated (e.g. both at the highest level) and use of the sports model gives better recognition results, then more specific sport models may be used. There is no need to use more specific health models. In fact, if the recognition result of the health model is very low, then recognition with this model may be terminated in favor of adding recognition with a more specific sport model. If several more specific sport models exist, e.g. for football, baseball, athletics, car racing, etc., then all of these models may be tested. The selection may also be simply based on the correspondence of the vocabularies of the specific models with the already recognized speech. If recognition with a specific model at a certain moment gives low results, recognition is preferably continued with at least one model hierarchically above the specific model.

Figure 5:
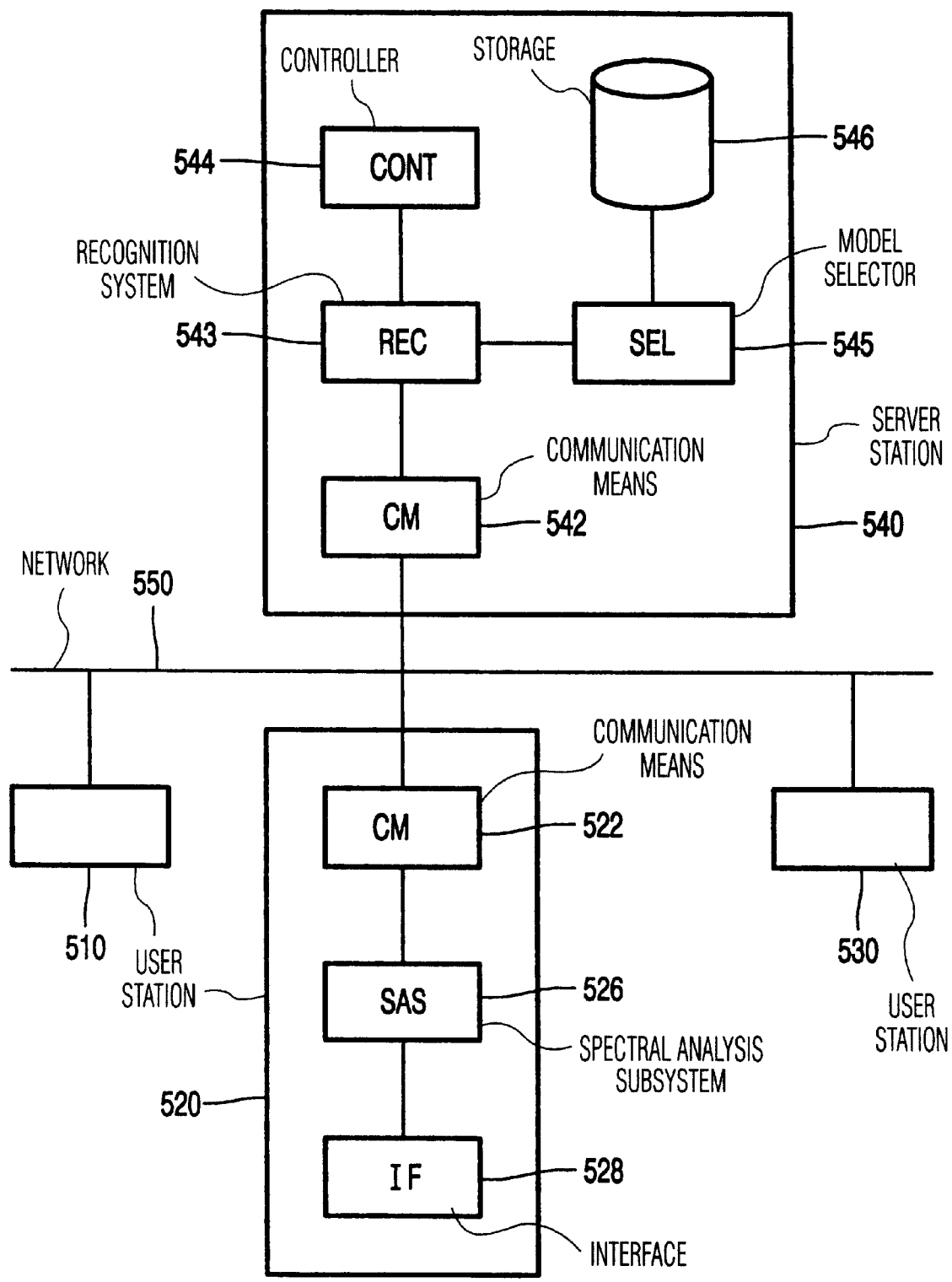
FIG. 5 shows a block diagram of a distributed system according to the invention.

In a preferred embodiment, as shown in FIG. 5, the recognition system is distributed. The distributed system comprises a server station 540 and at least one user station. Shown are three user stations 510, 520 and 530, where further details are only shown for user station 520. The stations may be implemented using conventional computer technology. For instance, the user station 520 may be formed by a desk-top personal computer or workstation, whereas the server station 540 may be formed by a PC server or workstation server. The computers are operated under control of a suitable program loaded in the processor of the computer. The server station 540 and the user stations 510, 520, and 530 are connected via a network 550. The network 550 may be any suitable network, such as a local area network, for instance in an office environment, or a wide area network, preferably Internet. The stations comprise communication means 522 and 542, respectively, for communicating via the network 550. Any communication means suitable for use in combination with the network 550 may be used. Typically, the communication means are formed by a combination of hardware, such as a communication interface or a modem, and software in the form of a software driver supporting a specific communication protocol, such as Internet's TCP/IP protocols. The user station 520 comprises means for receiving speech from a user, for instance via an interface 528. The user station 520 further comprises means for pre-processing the speech signal, making it suitable for transfer to the server station 540. For instance, the user station may comprise a spectral analysis subsystem 526 similar to the spectral analysis subsystem 110 of FIG. 1. The server station 540 performs all other tasks as described for system 300 of FIG. 3. For instance, the server station 540 comprises a recognition system 543 with a plurality of recognizers (similar to the recognition system 335 of FIG. 3), a controller 544 (similar to the controller 350 of FIG. 3), a model selector 545 (similar to the selector 360 of FIG. 3) and a storage 546 for storing the models (similar to the storage 340 of FIG. 3).

What is claimed is:

1. A huge vocabulary speech recognition system for recognizing a sequence of spoken words, the system comprising input means for receiving a time-sequential input pattern representative of the sequence of spoken words; and a large vocabulary speech recognizer operative to recognize the input pattern as a sequence of words from the vocabulary using a large vocabulary recognition model associated with the speech recognizer; characterized in that the system comprises a plurality of N large vocabulary speech recognizers, each being associated with a respective, different large vocabulary recognition model; each of the recognition models being targeted to a specific part of the huge vocabulary; and the system comprises a controller operative to direct the input pattern to a plurality of the speech recognizers and to select a recognized word sequence from the word sequences recognized by the plurality of speech recognizers.

2. A system as claimed in claim 1, wherein the system comprises M large vocabulary recognition models, M>N, and the system comprises a model selector operative to select for at least one of the speech recognizers the associated recognition model from the M models in dependence on a recognition context.

3. A system as claimed in claim 2, wherein the sequence of spoken words relates to a document that determines at least one recognition context.

4. A system as claimed in claim 3, wherein the document is a Web page, such as an HTML page, and the context(s) of the document is/are specified in the document or in association with the document.

5. A system as claimed in claim 3, wherein the model selector is operative to select the recognition model in dependence on words in or associated with the document.

6. A system as claimed in claim 2, wherein the model selector is operative to:

select a test recognition model from the N-M recognition models not yet used by one of the recognizers;

control a testing recognizer to recognize at least part of the input pattern with the test recognition model; and if the recognition result of the testing recognizer is better than the recognition result of one of the recognizers, enable recognition with the test recognition model.

7. A system as claimed in claim 1, wherein the recognition models are hierarchically arranged from models with a more generic context to models with a more specific context, and wherein the model selector is operative to enable recognition with a more specific model if recognition with the hierarchically-related more generic model at a higher level in the hierarchy obtains good recognition results compared to results of at least one recognizer associated with another recognition model.

8. A system as claimed in claim 1, wherein the system comprises a user station and a server station connected via a network, such as Internet; the user station being operative to receive the input pattern from a user and transfer a signal representative of the input pattern to the server station; the server station comprising the recognizers and controller.

* * * * *